(12) United States Patent
Saa-Garriga et al.

(10) Patent No.: US 12,586,156 B2
(45) Date of Patent: Mar. 24, 2026

(54) METHOD, SYSTEM AND APPARATUS FOR IMAGE ORIENTATION CORRECTION

(71) Applicant: SAMSUNG ELECTRONICS CO., LTD., Suwon-si (KR)

(72) Inventors: Albert Saa-Garriga, Staines (GB); Mehmet Yucel, Staines (GB); Tommaso Maestri, Staines (GB); Konstantinos Peppas, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 18/368,897

(22) Filed: Sep. 15, 2023

(65) Prior Publication Data

US 2024/0005453 A1    Jan. 4, 2024

Related U.S. Application Data

(63) Continuation of application No. PCT/KR2022/014935, filed on Oct. 5, 2022.

(30) Foreign Application Priority Data

Oct. 8, 2021    (GR) ............................... 20210100688
Oct. 12, 2021    (GB) ..................................... 2114602

(51) Int. Cl.
*G06T 3/60*        (2024.01)
*G06N 3/045*        (2023.01)
(Continued)

(52) U.S. Cl.
CPC .............. *G06T 3/60* (2013.01); *G06N 3/045* (2023.01); *G06N 3/098* (2023.01); *G06V 10/774* (2022.01);
(Continued)

(58) Field of Classification Search
CPC ...... G06N 3/044; G06N 3/045; G06N 3/0464; G06N 3/047; G06N 3/0475; G06N 3/092;
(Continued)

(56) References Cited

U.S. PATENT DOCUMENTS 11,077,795 B2     8/2021  Jales Costa et al.
11,100,617 B2 *   8/2021  Bazin ........................ G06N 3/09
(Continued)

FOREIGN PATENT DOCUMENTS

CN        111860835 A     10/2020
CN        112287927 A      1/2021
(Continued)

OTHER PUBLICATIONS

Ashutosh Saxena et al.,"Make3D: Learning 3D Scene Structure from a Single Still Image," May 20, 2008, IEEE Transactions on Pattern Analysis and Machine Intelligence, vol. 31, No. 5, May 2009,pp. 824-838.*

(Continued)

*Primary Examiner* — Omar S Ismail
(74) *Attorney, Agent, or Firm* — Sughrue Mion, PLLC

(57)        ABSTRACT

Broadly speaking, the present techniques generally relates to methods, systems and apparatuses for performing image orientation correction, i.e. correcting or adjusting images that are tilted. In particular, the present application relates to a computer-implemented method for generating a training dataset for training a machine learning, ML, model using federated learning to perform image orientation correction, and methods for training the ML model using the generated training dataset. Advantageously, the method to generate a training dataset enables a diverse training dataset to be generated while maintaining user data privacy, where the diversity refers to the range of image tilt angles represented by the dataset. The present application also provides meth- (Continued)

Per each image

Produce small
angle rotations
5 to -5 degrees

Producing minimal
impact on FOV

Image angle

Image angle  Image angle  Image angle
-5°                              +5°

Angle Distribution
after Augmentation ods for training the ML model using the generated training dataset.

17 Claims, 17 Drawing Sheets

(51) Int. Cl.

| | |
|---|---|
| *G06N 3/098* | (2023.01) |
| *G06V 10/774* | (2022.01) |
| *G06V 10/776* | (2022.01) |
| *G06V 10/82* | (2022.01) |
| *G06V 10/94* | (2022.01) |

(52) U.S. Cl.
CPC ............ *G06V 10/776* (2022.01); *G06V 10/82* (2022.01); *G06V 10/95* (2022.01); *G06V 2201/10* (2022.01)

(58) Field of Classification Search
CPC .......... G06N 3/094; G06N 3/098; G06T 3/60; G06V 10/774; G06V 10/776; G06V 10/82; G06V 10/95; G06V 2201/10
See application file for complete search history.

(56) References Cited

U.S. PATENT DOCUMENTS

| | | | | |
|---|---|---|---|---|
| 2019/0156122 | A1* | 5/2019 | Lu | G06V 10/761 |
| 2020/0210768 | A1* | 7/2020 | Turkelson | G06T 7/0002 |
| 2020/0335199 | A1* | 10/2020 | Accomazzi | H04L 67/1095 |
| 2021/0027434 | A1 | 1/2021 | Sheridan et al. | |
| 2021/0073566 | A1* | 3/2021 | Hoehne | G06V 30/166 |
| 2021/0110089 | A1* | 4/2021 | Chen | B25J 9/163 |
| 2021/0118157 | A1* | 4/2021 | Legendre | G06T 11/001 |
| 2021/0125036 | A1* | 4/2021 | Tremblay | G06N 3/094 |
| 2021/0166351 | A1* | 6/2021 | Younis | G06N 3/045 |
| 2021/0177295 | A1* | 6/2021 | Maximo | A61B 5/055 |
| 2021/0261128 | A1* | 8/2021 | Shah | B60W 10/18 |
| 2021/0380099 | A1* | 12/2021 | Lee | B60W 30/09 |
| 2021/0402942 | A1* | 12/2021 | Torabi | B60W 50/14 |
| 2022/0044441 | A1* | 2/2022 | Kalra | G06V 10/82 |
| 2022/0066456 | A1* | 3/2022 | Ebrahimi Afrouzi | |
| | | | | G06F 3/04883 |
| 2023/0004785 | A1 | 1/2023 | Uehara | |
| 2023/0053026 | A1* | 2/2023 | Wucher | G06N 20/10 |
| 2023/0094954 | A1* | 3/2023 | Sinha | G06V 10/776 |
| | | | | 382/103 |
| 2024/0005453 | A1 | 1/2024 | Saa-Garriga et al. | |

FOREIGN PATENT DOCUMENTS

| | | |
|---|---|---|
| CN | 112633265 A | 4/2021 |
| EP | 4327267 A1 | 2/2024 |
| JP | 2021-86284 A | 6/2021 |
| KR | 10-2019-0067717 A | 6/2019 |
| KR | 10-2020-0082305 A | 7/2020 |
| KR | 10-2020-0141835 A | 12/2020 |
| WO | 2019/070300 A1 | 4/2019 |
| WO | 2021/177879 A1 | 9/2021 |
| WO | 2021/193815 A1 | 9/2021 |
| WO | 2022/020167 A1 | 1/2022 |

OTHER PUBLICATIONS

Tejal Rane et al.,"A Deep Learning-Based Regression Scheme for Angle Estimation in Image Dataset," Jan. 11, 2023, Communications in Computer and Information Science ((CCIS,vol. 1704)),p. 282-292.*

Johannes Burge et al.,"Estimating 3D tilt from local image cues in natural scenes," Oct. 13, 2016, Journal of Vision (2016) 16(13):2,pp. 1-15.*

Lia Morra et al.,"Automatic detection of canonical image orientation by convolutional neural networks," Nov. 14, 2019,2019 IEEE 23rd International Symposium on Consumer Technologies (ISCT),pp. 118-122.*

Maji et al., "Deep Image Orientation Angle Detection," arXiv:2007. 06709v1 [cs.CV], 2020, Total 8 pages.

Workman et al., "Horizon Lines in the Wild," arXiv:1604.02129v2 [cs.CV], Aug. 2016, Total 12 pages.

Li et al., "Learning the Depths of Moving People by Watching Frozen People," 2019 IEEE/CVF Conference on Computer Vision and Pattern Recognition (CVPR), pp. 4516-4525, 2019.

Sandler et al., "MobileNetV2: Inverted Residuals and Linear Bottlenecks," 2018 IEEE/CVF Conference on Computer Vision and Pattern Recognition, pp. 4510-4520, 2018.

Deng et al., "ImageNet: A Large-Scale Hierarchical Image Database," 2009 IEEE Conference on Computer Vision and Pattern Recognition, pp. 248-255, 2009.

Communication (Combined Search and Exam Report) dated Mar. 23, 2022, issued by the Great Britain Intellectual Property Office in Great Britain Patent Application No. GB2114602.2.

Communication (Examination Report) dated Sep. 9, 2022, issued by the Great Britain Intellectual Property Office in Great Britain Patent Application No. GB2114602.2.

Communications dated Jan. 18, 2023, issued by the International Searching Authority in counterpart International Application No. PCT/KR2022/014935 (PCT/ISA/210 and PCT/ISA/237).

Ghosh et al., "An Efficient Framework for Clustered Federated Learning," arXiv:2006.04088v1 [stat.ML], Jun. 2020, Total 20 pages.

Communication dated Nov. 14, 2024 issued by the European Patent Office in European Patent Application No. 22878863.4.

Morra Lia et al: "Automatic detection of canonical image orientation by convolutional neural networks", 2019 IEEE 23rd International Symposium on Consumer Technologies (ISCT), IEEE, Jun. 19, 2019 (Jun. 19, 2019), pp. 118-123, XP033657671, DOI: 10.1109/ ISCE.2019.8901005 (6 pages total).

Communication issued on May 13, 2024 by the United Kingdom Patent Office in corresponding GB Patent Application No. 2114602. 2.

* cited by examiner

FIG. 2

Classifier based approach

Training ML model by client device

Device Available?

yes no

Init

Example F:
If there are more "yes"
then "no", output yes.

A: Device Temperature Okay
B: Phone charging
C: Phone CPU usage low
D: Phone GPU usage low
E: Between 02:00-04:00 AM
F: Decide using A,B,C,D,E Image angle
-5°

Image angle

Image angle
+5°

Update Main model

METHOD, SYSTEM AND APPARATUS FOR IMAGE ORIENTATION CORRECTION

CROSS-REFERENCE TO RELATED APPLICATION(S)

This application is a continuation application, claiming priority under § 365(c), of an International application No. PCT/KR2022/014935, filed on Oct. 5, 2022, which is based on and claims the benefit of a Greek patent application number 20210100688, filed on Oct. 8, 2021, in the Greek Intellectual Property Office and a Great Britain patent application number 2114602.2, filed on Oct. 12, 2021, in the Great Britain Intellectual Property Office, the disclosure of which is incorporated by reference herein in its entirety.

BACKGROUND

1. Field

The present application generally relates to methods, systems and apparatuses for performing image orientation correction, i.e. correcting or adjusting images that are tilted. In particular, the present application relates to a computer-implemented method for generating a training dataset for training a machine learning, ML, model using federated learning to perform image orientation correction, and methods for training the ML model using the generated training dataset.

2. Description of Related Art

Over the past few years, advances in deep learning have revolutionised the way people interact with everyday devices. Much of this success relies on the availability of large-scale training infrastructures and the collection of vast amounts of training data. However, users and providers are becoming increasingly aware of the privacy implications of this ever-increasing data collection, leading to the creation of various privacy-preserving initiatives by service providers and government regulators.

Federated Learning is a relatively new subfield of machine learning, ML, that allows the training of ML models without the training data leaving user devices. Instead, federated learning enables individual client devices to collaboratively train a ML model by moving the training computation to the client devices, while keeping all the training data private. During each round of the training process, participating client devices download the latest version of a global model and compute an updated model using their local data (i.e. data that is local to or stored on the client devices). These locally trained models are then sent from the participating client devices back to a central server which aggregates all the received locally trained models to generate an updated version of the global model. This is in contrast to centralised training where the training mechanism (e.g. the central server) has access to all the training data. Client devices can be mobile devices such as smartphones, appliances, wearables, or even servers or systems of entities such as hospitals and organisations. Therefore, it is desirable from data privacy and security perspectives to keep the data on those client devices private and avoid sharing the data with a central server to train a global model.

Image tilt correction is a technique used to automatically detect images that are tilted, to predict a tilt angle of the tilted images, and to suggest a rotation of the images to correct the tilt. There are a number of uses of image tilt correction. For example, any AI-based systems, such as robotics systems and autonomous vehicles, that are being used to make decisions based on received images need to know that the image and/or objects in the image are correctly oriented before they make a decision or perform an action. The suggested rotation rectifies the original image rotation based on the predicted tilt angle. Existing tilt correction techniques that are based on machine learning, ML, models are often trained using either a synthetically created training dataset or based on images that have been manually labelled by users with a tilt angle. Synthetically created training datasets are created from generic datasets of images, and each image in the generic dataset is rotated and cropped to build a synthetic image dataset. However, ML models need to be trained on training datasets containing a wide range of tilt angles, and synthetically created training datasets may contain images of decreased image quality due to the rotation operation and the field of view may be narrower as the rotation angle increases. Similarly, images that are captured and labelled by users may be restricted in terms of the type of scene depicted in the images, may not have accurate tilt angle labels, and the tilt angles themselves tend to be close to 0 because users try to hold their cameras steady and in the portrait or landscape orientation when capturing images. Thus, both types of training dataset are problematic.

Therefore, the present applicant has recognised the need for an improved technique for image tilt correction.

SUMMARY

In a first approach of the present techniques, there is provided a computer-implemented method, performed by a client device, for generating a training dataset for training a machine learning, ML, model using federated learning to perform image orientation correction, the method comprising: capturing an image of a scene using an image capture device of the client device; obtaining, from a sensor, a predicted tilt angle of the scene in the image; determining whether the captured image and predicted tilt angle improves a non-bias score of a database of the client device, the database forming a training dataset for training the ML model; and storing metadata associated with the captured image in the database of the client device when the captured image is determined to improve the non-bias score of the database.

As mentioned above, existing machine learning methods to perform image orientation correction require large volumes of diverse image data to be trained. More specifically, the image data needs to be labelled with tilt angle information to enable the ML model to learn how to predict a tilt angle for an input image and thereby suggest a rotation to correct the predicted tilt angle. Small training datasets usually result in low-accuracy models, and poor generalisation. That is, if a ML model has poor generalisation capability, it will not be able to accurately perform image orientation correction on an image that has a tilt it has not previously seen (i.e. been trained on). Similarly, large but non-diverse training datasets also suffer from poor generalisation. Large and diverse training datasets that are labelled are difficult to obtain, as the larger the dataset, the longer the laborious data labelling process will take.

The present techniques overcome these issues by providing a data generation technique that generates data suitable for training a ML model to perform image orientation correction. As noted above, the data generation technique of the present techniques enables a diverse training dataset to be generated, while maintaining user data privacy. The training dataset is generated to cover more possible tilts. For example, the training dataset may be generated to contain images with tilts ranging from 0 degrees to 180 degrees. A training dataset is generated on a per-client device basis. That is, each client device that participates in the federated learning process generates its own training dataset to train a ML model stored on the device. Advantageously, this means that the images which form the training dataset are retained on the client device, but weights of the trained model may be shared with other devices and/or a central server to enable other models to be updated. Thus, images captured by a large number of client devices are used to train a ML model, without having to share the images themselves. The fact that many client devices are being used to train a ML model itself improves the ML model, as the images captured by the client devices are likely to depict a diverse range of scenes and have a wide range of tilt angles.

Further advantageously, the data generation technique described herein decides whether or not a captured image should be included in the training dataset based on whether the captured image is valuable for training purposes.

The data generation may further comprise determining, for each image corresponding to metadata stored in the database, an embedding vector representing characteristics of the image.

The data generation method may further comprise: calculating a non-bias score for the database by calculating a difference between a dispersion value of a distribution of a target training dataset representing an unbiased dataset, and a dispersion value of the distribution of the database.

The data generation method may further comprise: augmenting data in the database with synthetically generated images to improve a non-bias score of the database.

Augmenting the data in the database may comprise: rotating the captured image to produce at least one synthetically generated version of the captured image having a tilt angle that improves a non-bias score of the database. The rotation may be between 5 degrees in a clockwise direction and 5 degrees in an anticlockwise direction.

Augmenting the data in the database may comprise: altering an appearance of the captured image to produce at least one synthetically generated version of the captured image. Altering an appearance of the captured image may comprise applying one or more of: a change in colour distribution, noise, Gaussian noise, a blur, motion blur, zoom blur, and simulated weather effects (such as fog, rain, snow, etc.) Essentially, any augmentation to alter the appearance can be applied as long as it does not change the tilt angle.

Augmenting the data in the database may comprise: inserting an object into the captured image to produce at least one synthetically generated version of the captured image while retaining a tilt angle of the original captured image.

Storing metadata associated with the captured image may comprise storing the embedding vector representing characteristics of the image in the database. Thus, in some cases, the captured image that is suitable for training is not itself added to the database. The captured image may be stored elsewhere on the client device (such as in the photo gallery of the client device), and information identifying the captured image is stored in the database to avoid duplicating images and using-up valuable storage space. The embedding vectors may be stored to enable incoming images to be readily compared with images that already form the training dataset, which as explained above, enables the suitability of the incoming image for training purposes to be determined.

In a second approach of the present techniques, there is provided a client device for generating a training dataset for training a machine learning, ML, model using federated learning to perform image orientation correction, the client device comprising: an image capture device, for capturing an image of a scene; a sensor for providing a predicted tilt angle of the scene in the captured image; storage comprising a database forming a training dataset for training the ML model; and at least one processor coupled to memory and arranged to: determine whether the captured image and predicted tilt angle improves a non-bias score of the database, and store metadata associated with the captured image in the database when the captured image is determined to improve the non-bias score of the database.

The features described above with respect to the first approach apply equally to the second approach.

The client device may be: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example devices.

In a third approach of the present techniques, there is provided a computer-implemented method, performed by a client device, for training a machine learning, ML, model using federated learning to perform image orientation correction, the method comprising: obtaining a ML model for training locally by the client device; checking whether computational resources of the client device are available to train the ML model; and training the ML model, when the resources are available, using a training dataset on the client device, the training dataset comprising metadata associated with images having a range of tilt angles.

The training method may further comprise: determining, prior to training the ML model, whether a training dataset on the client device has a non-bias score above a predetermined threshold value; and training the ML model when the non-bias score is above the threshold value.

The training method may further comprise: training a secondary ML model when the non-bias score is below the threshold value, and when the non-bias score is above a second predetermined threshold value, wherein the secondary ML model is a copy of the ML model for use when the non-bias score is below the threshold value.

The ML model comprises a plurality of neural network layers and training the ML model or secondary ML model may comprise training a final layer of the plurality of neural network layers.

Training the ML model or secondary ML model may comprise training using the metadata of the training dataset, wherein for each image, the metadata comprises an embedding vector representing characteristics of the image and a predicted tilt angle of the image.

The training method may further comprise: receiving a request for model weights of the trained ML model; sharing, responsive to the request, model weights of the trained ML model with a central server for aggregating when the non-bias score is above the threshold value, thereby enabling the central server to update the ML model; and receiving the updated ML model from the central server. Preferably, the method may comprise clearing the training dataset on the client device of the metadata used to train the ML model.

Sharing model weights of the trained ML model with a central server may comprise: transmitting the model weights to the central server directly.

Sharing model weights of the trained ML model with a central server may comprise: transmitting the model weights to at least one other client device of a plurality of client devices using a peer-to-peer distribution mechanism, wherein one client device of the plurality of client devices aggregates all model weights and transmits the aggregated model weights to the central server.

The training method may further comprise: receiving a request for model weights of the trained ML model; sharing, responsive to the request, a tilt angle histogram with a sender of the request, thereby enabling the sender to aggregate tilt angle histograms received from a plurality of client devices.

In a fourth approach of the present techniques, there is provided a client device for training a machine learning, ML, model using federated learning to perform image orientation correction, the client device comprising: at least one processor coupled to memory and arranged to: obtain a ML model for training locally by the client device; check whether computational resources of the client device are available to train the ML model; and train the ML model, when the resources are available, using a training dataset on the client device, the training dataset comprising metadata associated with images having a range of tilt angles.

The features described above with respect to the third approach apply equally to the fourth approach. The client device may be, for example, any of the devices mentioned above with respect to the second approach.

In a fifth approach of the present techniques, there is provided a system for training a machine learning, ML, model using federated learning to perform image orientation correction, the system comprising: a central server comprising at least one processor coupled to memory to obtain and store an ML model for training; and a plurality of client devices, each client device comprising at least one processor coupled to memory and arranged to: obtain a ML model for training locally by the client device; check whether computational resources of the client device are available to train the ML model; and train the ML model, when the resources are available, using a training dataset on the client device, the training dataset comprising metadata associated with images having a range of tilt angles.

The processor of each client device may be arranged to: determine, prior to training the ML model, whether a training dataset on the client device has a non-bias score above a predetermined threshold value; and train the ML model when the non-bias score is above the threshold value.

The processor of each client device may be arranged to: train a secondary ML model when the non-bias score is below the threshold value, and when the non-bias score is above a second predetermined threshold value, wherein the secondary ML model is a copy of the ML model for use when the non-bias score is below the threshold value.

The ML model comprises a plurality of neural network layers and training the ML model or secondary ML model may comprise training a final layer of the plurality of neural network layers.

Training the ML model or secondary ML model may comprise training using the metadata of the training dataset, wherein for each image, the metadata comprises an embedding vector representing characteristics of the image and a predicted tilt angle of the image.

The processor of each client device may be arranged to: receive, from the central server, a request for model weights of the trained ML model of the client device; and share, responsive to the request, model weights of the trained ML model with the central server when the non-bias score is above the threshold value.

The processor of the central server may be arranged to: aggregate received model weights; update the ML model stored on the central server; and transmit the updated ML model to the plurality of client devices.

The processor of each client device may be arranged to: clear the training dataset on the client device of the metadata used to train the ML model.

The processor of each client device may be arranged to transmit the model weights to the central server directly.

The processor of each client device may be arranged to transmit the model weights to at least one other client device of the plurality of client devices using a peer-to-peer distribution mechanism, wherein one client device of the plurality of client devices aggregates all model weights and transmits the aggregated model weights to the central server.

The processor of each client device may be arranged to: receive, from a weights requester, a request for model weights of the trained ML model; and share, responsive to the request, a tilt angle histogram with the weights requester.

The weights requester may aggregate tilt angle histograms received from a plurality of client devices.

The weights requester may: transmit, to the client devices, a further request for model weights of their secondary ML models, when a non-bias score of the aggregated tilt angle histograms is above the threshold value. Preferably, the weights requester may: aggregate model weights of secondary ML models received from the client devices; transmit the aggregated model weights to the client devices for use; and transmit the aggregated model weights to the central server for updating the ML model.

The weights requester may be a client device of the plurality of client devices.

In a related approach of the present techniques, there is provided a non-transitory data carrier carrying processor control code to implement the methods described herein. That is, there is provided a computer-readable storage medium comprising instructions which, when executed by a computer, cause the computer to carry out the steps of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIG. 2 is a schematic diagram showing an existing technique to generate a training dataset for training a ML model to perform image orientation correction;

DETAILED DESCRIPTION

Broadly speaking, the present techniques generally relate to methods, systems and apparatuses for performing image orientation correction, i.e. correcting or adjusting images that are tilted. In particular, the present application relates to a computer-implemented method for generating a training dataset for training a machine learning, ML, model using federated learning to perform image orientation correction, and methods for training the ML model using the generated training dataset.

Advantageously, the method to generate a training dataset enables a diverse training dataset to be generated while maintaining user data privacy, where the diversity refers to the range of image tilt angles represented by the dataset. The present application also provides methods for training the ML model using the generated training dataset.

Figure 1:
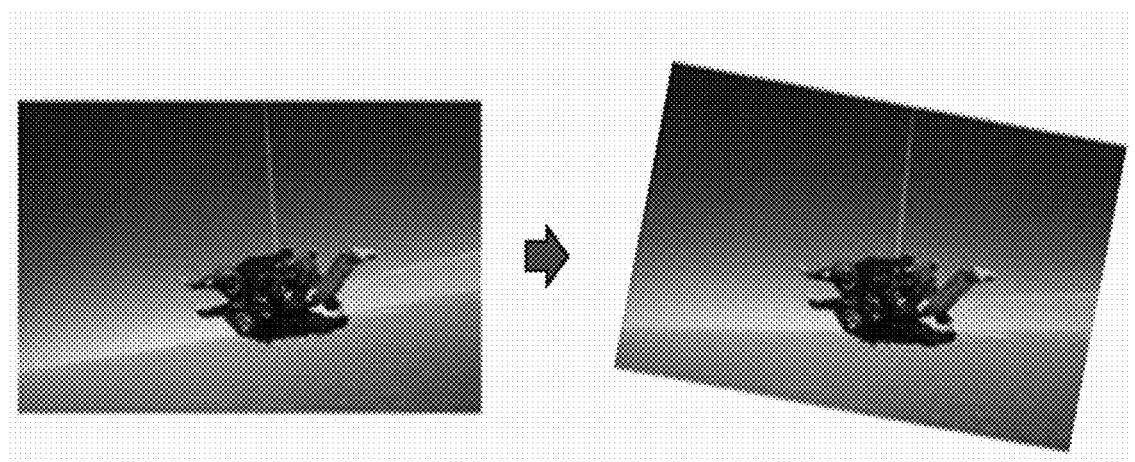
FIG. 1 shows an example of a tilted image.

FIG. 1 shows an example of a tilted image (left hand side) that may be tilted because a camera was tilted or rotated relative to e.g. the horizon, when the image was captured, and an example of how the tilted image may be rotated to counteract the tilt (right hand side). Image tilt correction is a technique used to automatically detect images that are tilted, to predict a tilt angle of the tilted images, and to suggest a rotation of the images to correct the tilt. The suggested rotation rectifies the original image rotation based on the predicted tilt angle.

Existing tilt correction techniques that are based on machine learning, ML, models are often trained using either a synthetically created training dataset or based on images that have been manually labelled by users with a tilt angle.

Figure 2:
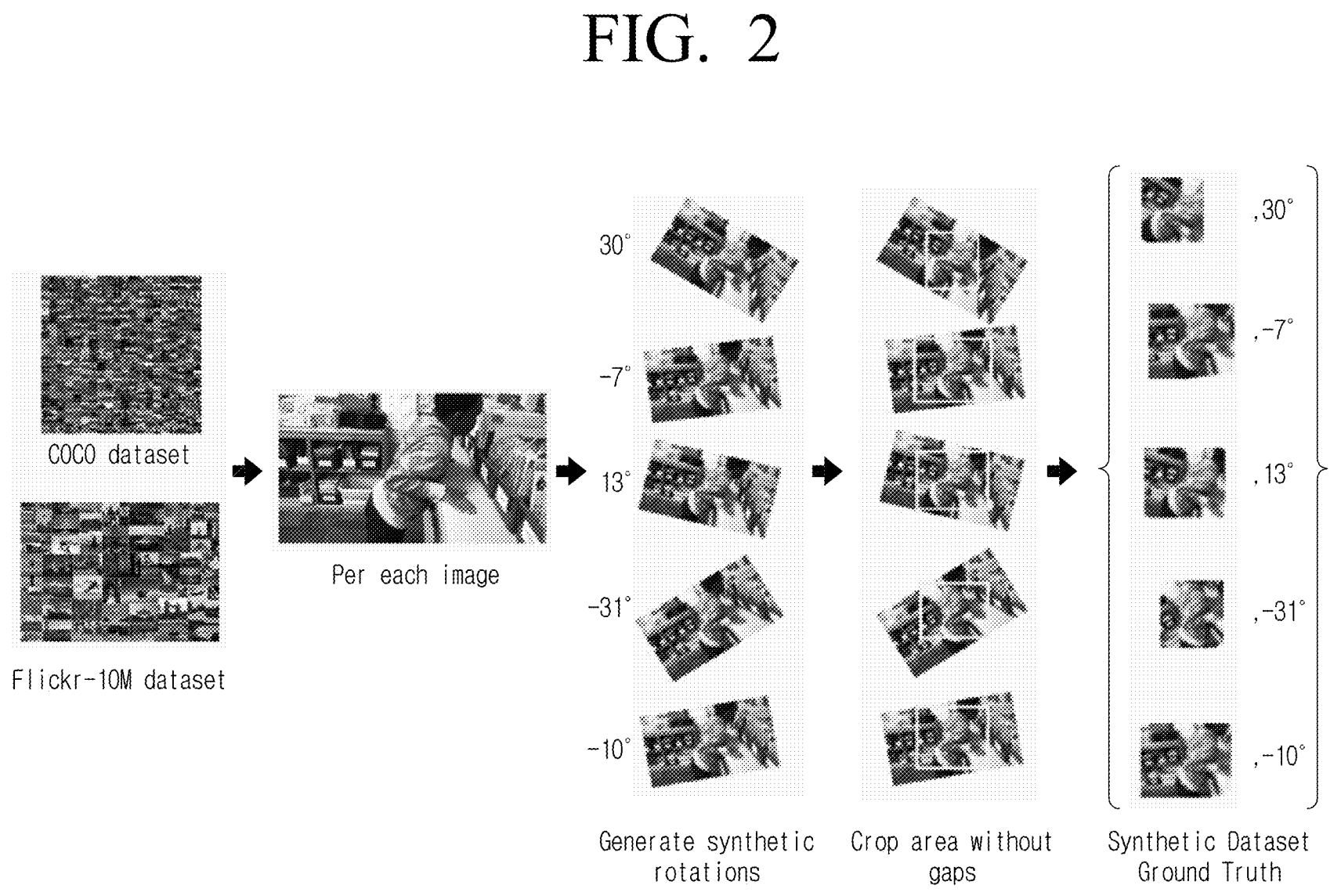

FIG. 2 is a schematic diagram showing an existing technique to generate a training dataset for training a ML model to perform image orientation correction. Synthetically created training datasets are created from generic datasets of images, and each image in the generic dataset is rotated and cropped to build a synthetic image dataset. However, ML models need to be trained on training datasets containing a wide range of tilt angles, and synthetically created training datasets may contain images of decreased image quality due to the rotation operation and the field of view may be narrower as the rotation angle increases.

Figure 3:
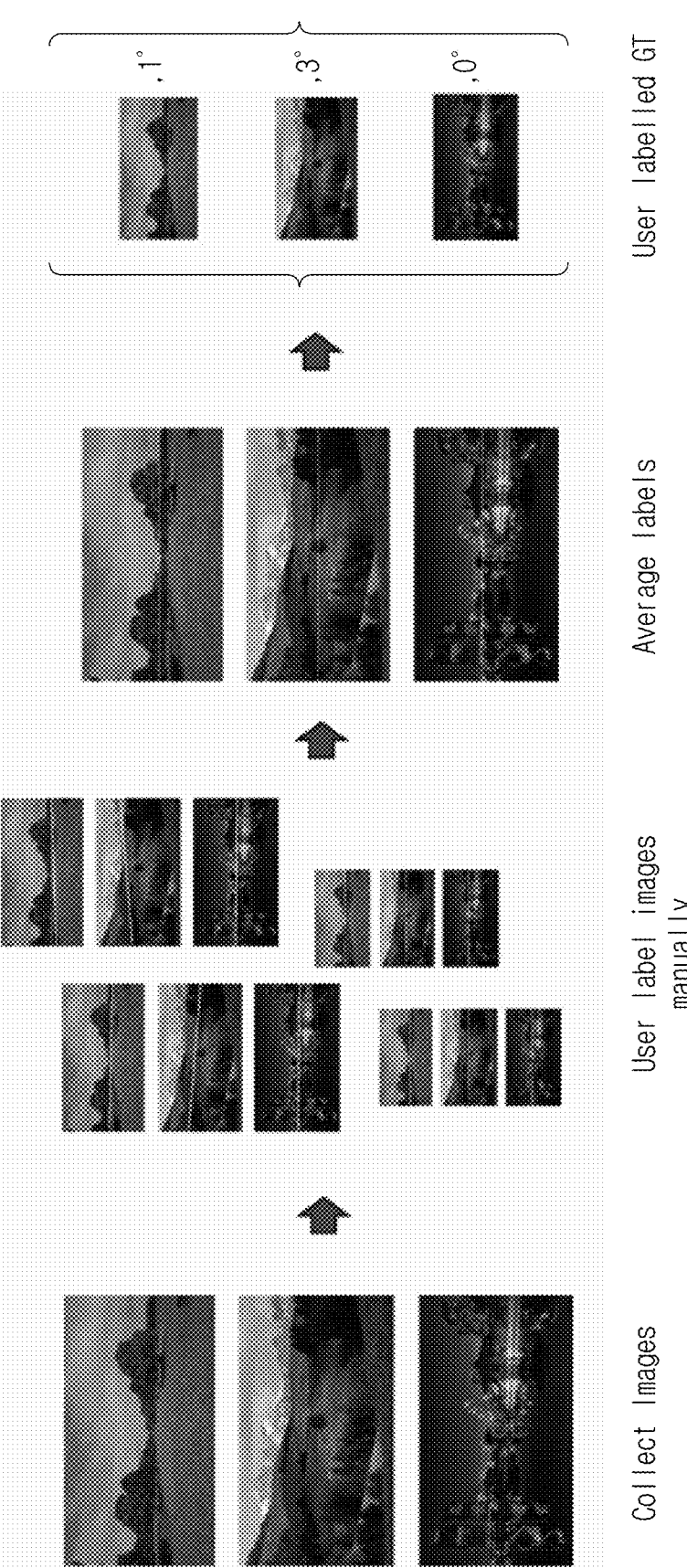
FIG. 3 is a schematic diagram showing an existing technique to generate a training dataset for training a ML model to perform image orientation correction.

FIG. 3 is a schematic diagram showing an existing technique to generate a training dataset for training a ML model to perform image orientation correction. Images that are captured and labelled by users may be restricted in terms of the type of scene depicted in the images, may not have accurate tilt angle labels, and the tilt angles themselves tend to be close to 0 because users try to hold their cameras steady and in the portrait or landscape orientation when capturing images. Thus, both types of training dataset are problematic.

Figure 4:
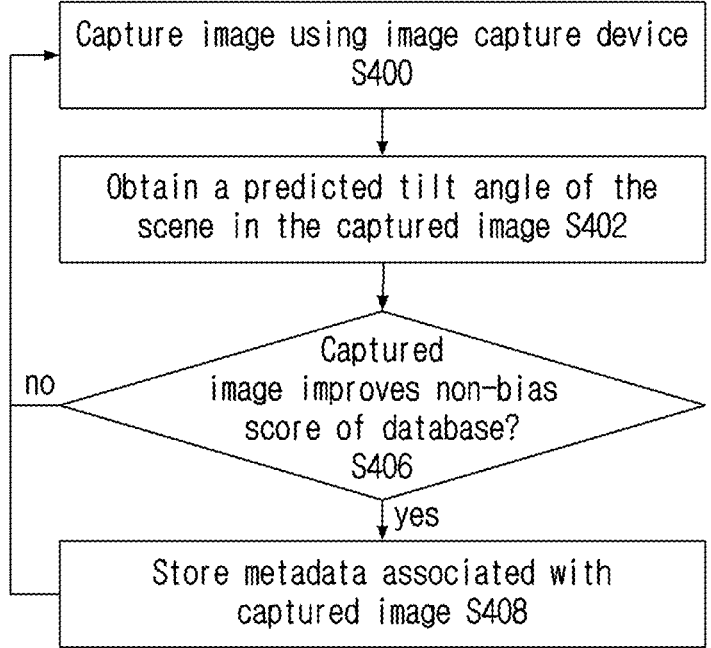
FIG. 4 is a flowchart of example steps to generate a training dataset for training a ML model according to the present techniques.

FIG. 4 is a flowchart of example steps to generate a training dataset for training a ML model according to the present techniques. The method comprises: capturing an image of a scene using an image capture device of the client device (step S400); and obtaining, from a sensor, a predicted tilt angle of the scene in the image (step S402). The sensor of the client device may be any suitable sensor, such as a gyroscope. The method comprises: determining whether the captured image and predicted tilt angle improves a non-bias score of a database of the client device, the database forming a training dataset for training the ML model (step S406); and storing metadata associated with the captured image in the database of the client device when the captured image is determined to improve the non-bias score of the database (step S408). If the captured image is determined not to improve the non-bias score of the database, the captured image (or its metadata) is not added to the training dataset. The method may continue until a wide variety of tilted images are captured and included in the training dataset.

The present techniques have a number of advantages. By generating a training dataset in the manner described above, a ML model trained using the generated training data set is trained using a wide variety of scenes, because the images used to build the dataset are captured by users, and different users take photos of different types of scenes, objects or environments. As sensor data is used to make a tilt angle prediction, unreliable user labelling is not used and the images are more accurately labelled with tilt angles. By quantifying training quality, as mentioned above, the trained ML model is robust to all rotations. That is, the trained ML model will be better able to predict and correct a tilt angle in a new input image if it has been trained on images representing a wide range of tilt angles. The ML model is also trained incrementally, because it may take some time to generate a training dataset that is unbiased, such that its performance improves with time and with each training round. As explained in more detail below, the dataset generation process and the training process are data efficient, such that a minimum amount of data is stored and shared. Crucially, the resulting trained ML model is content dependent and object independent. This may be achieved by augmenting the data in the training dataset, as described below. The ML model is able to generalise, using the proposed data bias avoidance mechanisms.

Thus, the data generation method shown in FIG. 4 may further comprise determining, for each image corresponding to metadata stored in the database, an embedding vector representing characteristics of the image.

Figure 5A:
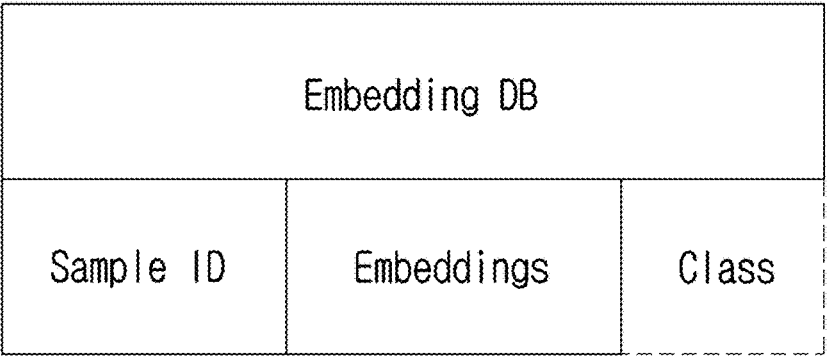
FIG. 5A, FIG. 5B and FIG. 5C illustrate techniques for determining a non-bias score of the training dataset.
Figure 5B:
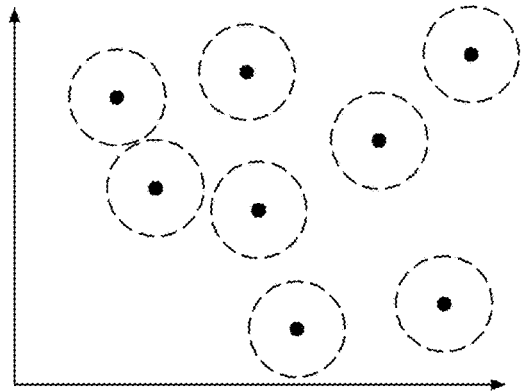
Figure 5C:
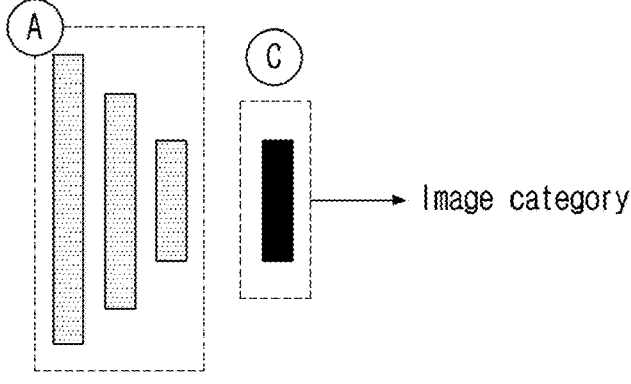

FIG. 5A, FIG. 5B and FIG. 5C illustrate techniques for determining a non-bias score of the training dataset. As mentioned above, including with reference to FIG. 4, the dataset generation method comprises determining whether the captured image and predicted tilt angle improves a non-bias score of a training dataset of the client device, and only storing metadata associated with the captured image in the database of the client device when the captured image is determined to improve the non-bias score of the database. In other words, images (or the metadata) are only added to the training dataset if they have value in reducing the bias of the training dataset. The bias may be reduced by images which depict different scenes, by images with different tilt angles, by images of differing picture quality, and so on.

FIG. 5A shows how the database may be constructed. The metadata associated with the captured image may be an image identifier (so that the image can be located on the device if needed), an embedding vector representing the image, and any classification or label information (which may specify what the image shows or represents). Similar data (e.g. the embedding vector and/or classification(s)) obtained for an incoming captured image may then be compared with the data in the database to determine whether the captured image is similar to images already represented in the database.

FIG. 5B shows how the embedding vectors should be spread across multidimensional space so that the database covers as many situations as possible, i.e. as many scenes, tilt angles, image qualities, and so on. Keeping a distance between the embeddings forces the samples to be spread-out, and thus this distance-based approach may be used to determine if similar image content to a newly captured image already exists in the database FIG. 5C shows a classifier-based approach for determining how close a newly captured image is to existing images in the database. An image classifier layer may be used to give the additional image information. The image space may be divided into N classes and images in the database should be collected in a way to ensure a uniform distribution among the classes.

Figure 6:
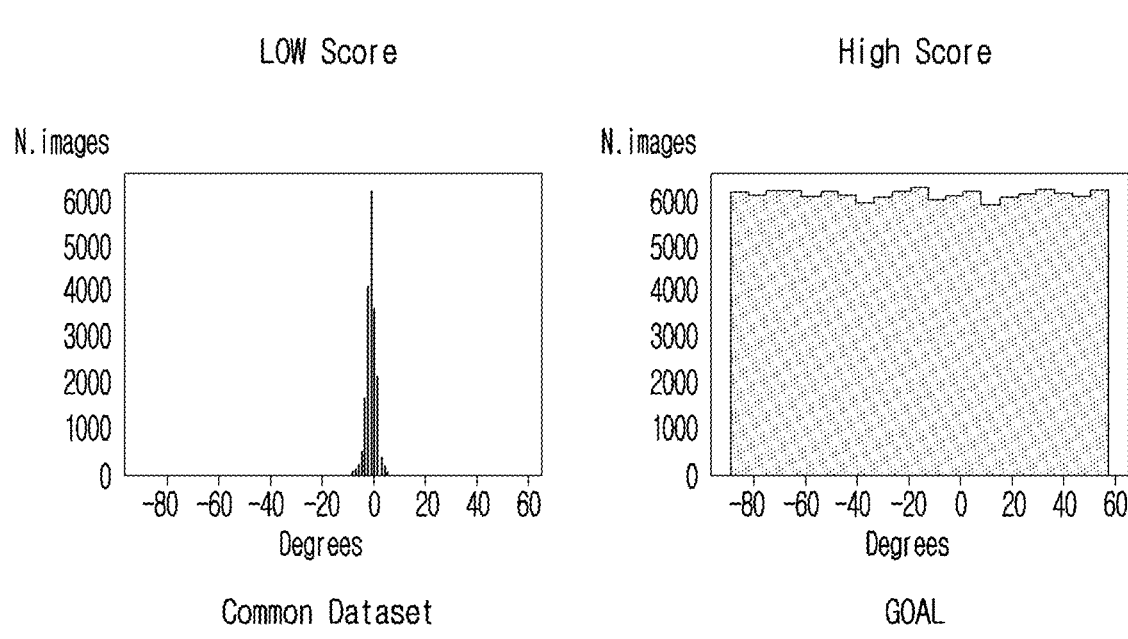
FIG. 6 illustrates training datasets having different non-bias scores.

As noted above, a goal of the present techniques is to obtain a well-distributed set of training data. The non-bias score determines the quality of the data in the database. For that reason, standard deviation may be used to determine whether an image is to be added to the database. FIG. 6 illustrates training datasets having different non-bias scores. The image on the left hand side shows a dataset that has a low non-bias score, meaning the dataset is biased. It can be seen that the data in the dataset are clustered around a single point, which means many images in the dataset are similar in some way (e.g. have similar tilt angles). The image on the right hand side shows a dataset that has a high non-bias score, meaning the dataset is less biased or unbiased. This is the aim of the data generation methods of the present techniques. It can be seen that data in this dataset is more spread-out and diverse.

To calculate the non-bias score, the standard deviation may be used as a metric, which measures the degree of dispersion of the data in the dataset. A target value of the standard deviation for a training dataset can be calculated as the standard deviation for a training dataset having a uniform distribution. For example, for tilt angles between 0 degrees and 180 degrees, the uniform distribution may be given by $(180)/\mathrm{sqrt}(180)$, where $180$ on the top of the equation represents a normalised sample between 0 and 1 for each of the angles. Thus, a tilt angle histogram has to be normalised before the distance between the existing training dataset distribution and the target distribution can be calculated.

Thus, the data generation method shown in FIG. 4 may further comprise: calculating a non-bias score for the database by calculating a difference between a dispersion value of a distribution of a target training dataset representing an unbiased dataset, and a dispersion value of the distribution of the database.

It will be understood that there are multiple ways to calculate the distance or difference between the existing training dataset and a target/ideal training dataset. For example, the accumulated distance from each bin to 1 may be used (here the distance should be close to 0), or the normalised bins may be summed (here the distance should be close to 180), or the mean of the bins may be calculated (here the distance should be close to 1).

The data generation method shown in FIG. 4 may further comprise: augmenting data in the database with synthetically generated images to improve a non-bias score of the database. Augmenting the data may enable gaps in the dataset to be filled or for the diversity of the dataset to be increased. For example, the dataset may be augmented with data that contains images of particular tilt angles, or of differing image quality. This is important to ensure an ML model trained on the dataset is able to accurately process a wide variety of incoming images. Thus, the non-bias score of a dataset may be improved by applying data augmentation techniques that improve content and/or appearance distribution and/or reduce object dependency.

Figure 7:
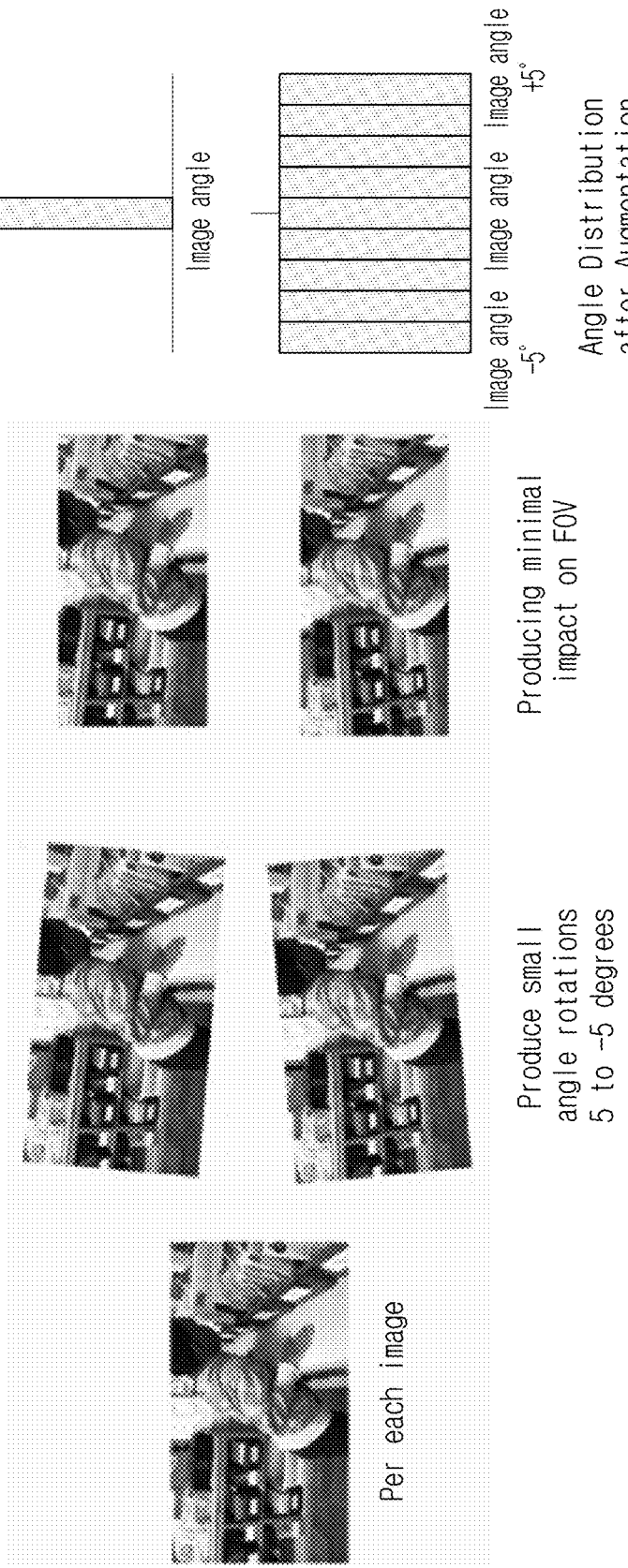
FIG. 7 illustrates one technique for augmenting the data in the training dataset to improve a non-bias score of the database.

FIG. 7 illustrates one technique for augmenting the data in the training dataset to improve a non-bias score of the database, by improving a distribution of content in the dataset. Synthetically generated image rotations may improve the distribution of images in the dataset. However, the synthetic rotations are limited to 5 degrees in the clockwise and anticlockwise direction to minimise the impact on the field of view of the image. (Larger rotations will require more of the image to be cropped to remove white space, which means the remaining image may contain less meaningful content). The diagram shows how the angle distribution may be improved.

Thus, augmenting the data in the database may comprise: rotating the captured image to produce at least one synthetically generated version of the captured image having a tilt angle that improves a non-bias score of the database. The rotation may be between 5 degrees in a clockwise direction and 5 degrees in an anticlockwise direction.

In another augmentation technique that improves a distribution of appearance in the dataset, the tilt angle of an image is not changed, and instead an aspect of the image appearance is changed to diversity the training dataset. One or more appearance augmentations may be used, which may be sampled/applied randomly to images, in a cascade manner. Such augmentations will not change the ground-truth tilt angle.

Thus, augmenting the data in the database may comprise: altering an appearance of the captured image to produce at least one synthetically generated version of the captured image. Altering an appearance of the captured image may comprise applying one or more of: a change in colour distribution, noise, Gaussian noise, a blur, motion blur, zoom blur, and simulated weather effects (such as fog, rain, snow, etc.) Essentially, any augmentation to alter the appearance can be applied as long as it does not change the tilt angle.

Figure 8:
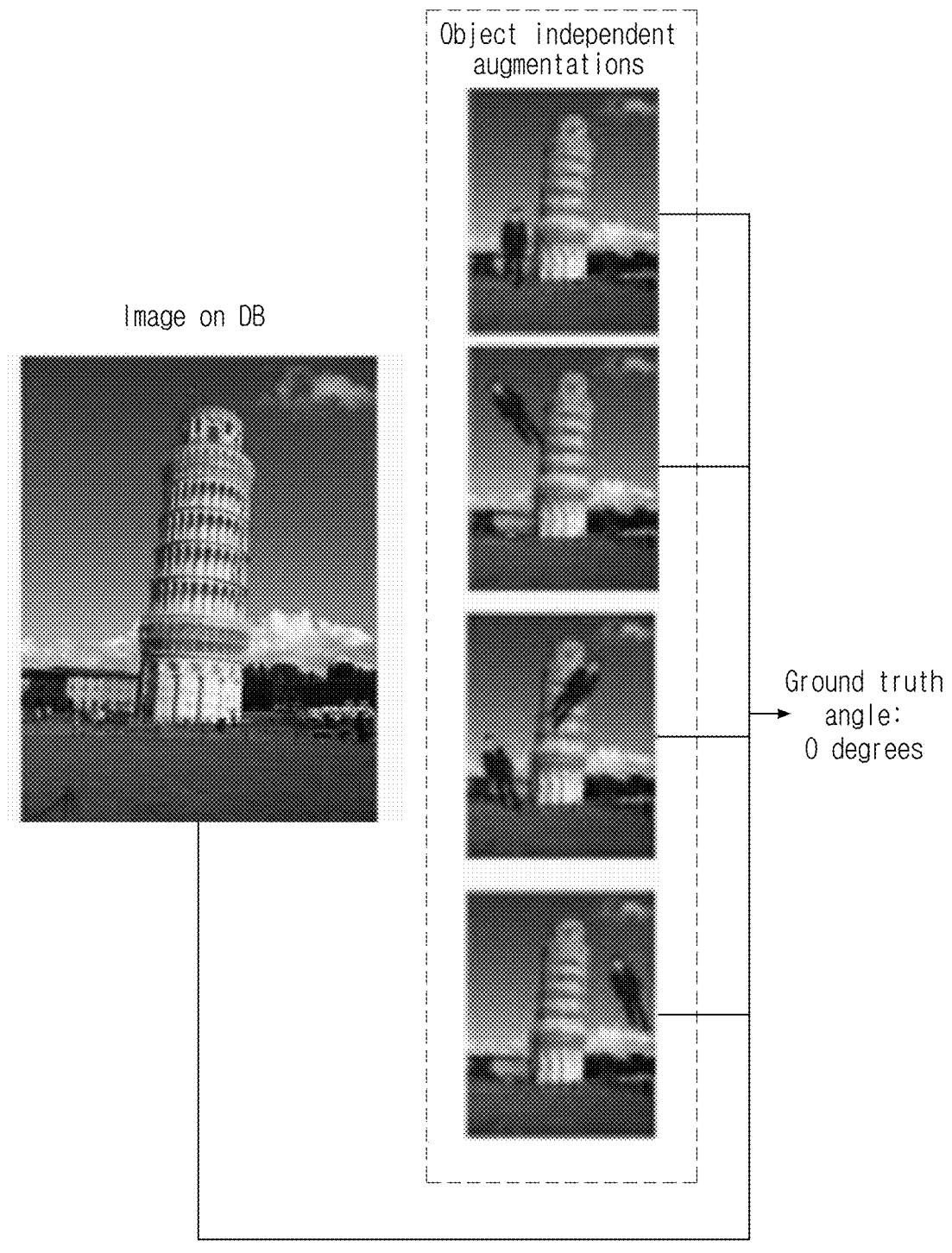
FIG. 8 illustrates another technique for augmenting the data in the training dataset to improve a non-bias score of the database.

FIG. 8 illustrates another technique for augmenting the data in the training dataset to improve a non-bias score of the database, by reducing object dependency. Here, data augmentation involves reducing object dependency or object bias when determining how to correct a tilt of an image. The ML model should not, for example, focus on one object in a scene and use this to determine the tilt angle to be corrected. A good example of this is the Leaning Tower of Pisa, which is itself tilted. If the ML model was object dependent, it would focus on the Leaning Tower and determine incorrectly that the image is tilted. To reduce object bias, this augmentation technique uses sensor data (on tilt angle) associated with image content, rather than just image objects. To force the system to be content dependent and object independent, objects are synthetically blended onto the scene of an image. The augmentations do not change the ground-truth tilt angle. It can be seen in FIG. 8 that an image of a man has been added to the original image of the Leaning Tower, and the man appears in different places in different orientations. By adding in another object that is angled/titled within an image that itself is not tilted, means the ML model can learn to not depend on individual objects to determine if an image is tilted.

Thus, augmenting the data in the database may comprise: inserting an object into the captured image to produce at least one synthetically generated version of the captured image while retaining a tilt angle of the original captured image.

Figure 9:
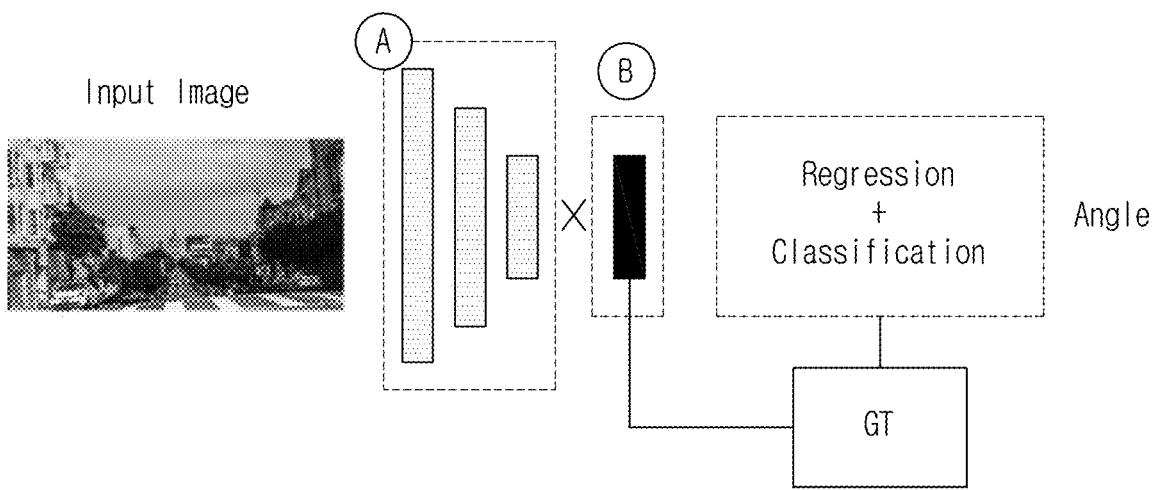
FIG. 9 is a schematic diagram illustrating a lightweight approach to training a ML model on-device using the client device training dataset.

FIG. 9 is a schematic diagram illustrating a lightweight approach to training a ML model on-device using the client device training dataset. It is desirable to generate a training dataset in a memory efficient manner. Storing metadata associated with the captured image may comprise storing the embedding vector representing characteristics of the image in the database. The embeddings may be stored as a tuple (angle, embeddings) so that memory usages is reduced. FIG. 9 shows a typical pipeline for tilt prediction comprising an encoder network (A) and a prediction layer (B), where the prediction layer may be a regression layer classification layer, or combination of the two. It has been seen that training only the final layer on-device improves the ML model. Thus, portion (A) may be static during the whole training process, as a given input image will always produce the same embeddings (X) that will be input into the portion (B). This is advantageously used to store only the embeddings in the database instead of the corresponding RGB image, thereby saving memory usage.

Thus, in some cases, the captured image that is suitable for training is not itself added to the database. The captured image may be stored elsewhere on the client device (such as in the photo gallery of the client device), and information identifying the captured image is stored in the database to avoid duplicating images and using-up valuable storage space. The embedding vectors may be stored to enable incoming images to be readily compared with images that already form the training dataset, which as explained above, enables the suitability of the incoming image for training purposes to be determined.

Figure 10:
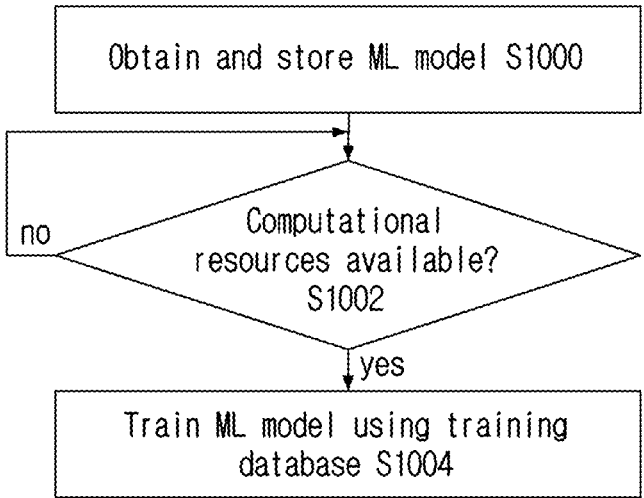
FIG. 10 is a flowchart of example steps to train a ML model on-device using the client device training dataset.

FIG. 10 is a flowchart of example steps to train a ML model on-device using the client device training dataset to perform image orientation correction. The method comprises: obtaining a ML model for training locally by the client device (step S1000); checking whether computational resources of the client device are available to train the ML model (step S1002); and training the ML model, when the resources are available, using a training dataset on the client device, the training dataset comprising metadata associated with images having a range of tilt angles (step S1004). Thus, training does not take place as soon as there is new data in the training dataset, because training on-device is time and resource-consuming and may negatively impact the user's experience while they are using the device. Thus, a set of rules that determine the optimal time to update the model may be used, based on whether computational resources of the client device are available and/or the operational state of the client device.

Figure 11:
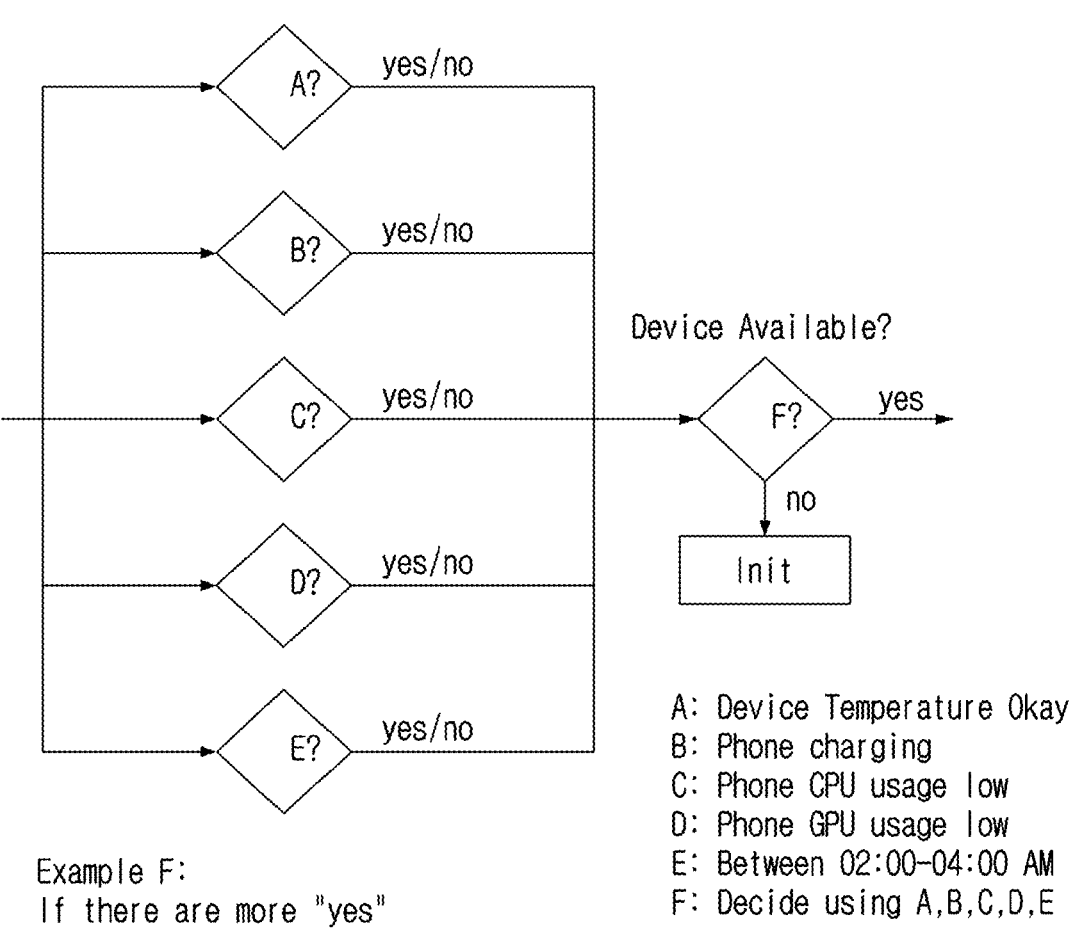
FIG. 11 is a flowchart of example steps to determine when a client device is able to train a ML model.

FIG. 11 is a flowchart of example steps to determine when a client device is able to train a ML model. Checking the operational state of the client device may comprise checking a temperature of the client device, whether the client device is charging (i.e. whether a battery-operated device is plugged into a mains power supply or is running using the battery power), the current CPU and/or GPU usage, and the time of day (e.g. it may be preferable to perform the training at night when the user is not using the device).

The training method of FIG. 10 may further comprise: determining, prior to training the ML model, whether a training dataset on the client device has a non-bias score above a predetermined threshold value; and training the ML model when the non-bias score is above the threshold value. In some cases, it may be useful to train the ML model using the dataset even when the non-bias score is below a threshold value, in which case only the device availability matters. It will be understood that this may result in a less good update to the ML model. In other cases, it may be useful to train the ML model when the non-bias score is above a threshold value. In this case, even when a device is available for training, the training may not occur of the non-bias score requirement is not satisfied.

Two models may exist, and one of these models may be updated at a given point in time. The two models are a main ML model and a secondary ML model.

Figure 12:
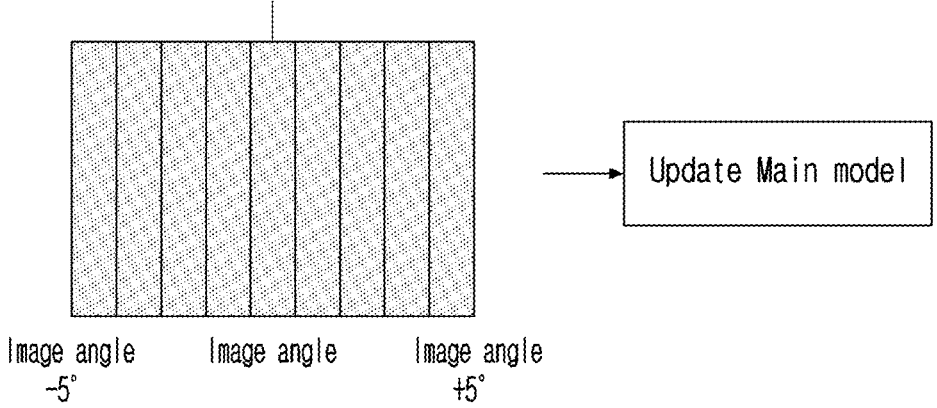
FIG. 12 is a schematic diagram illustrating when a ML model may be trained.

FIG. 12 is a schematic diagram illustrating when a ML model may be trained. Here, the training dataset is not biased (has a high non-bias score). In this case, the main ML model is trained, because this is the one which will be used for on-device predictions and tilt corrections, and/or used in the federated learning process.

Figure 13:
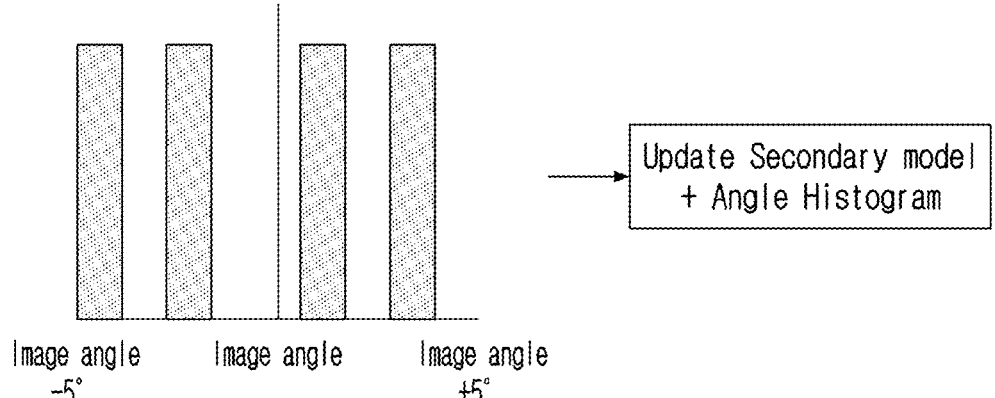
FIG. 13 is a schematic diagram illustrating when a secondary ML model may be trained.
Figure 14:
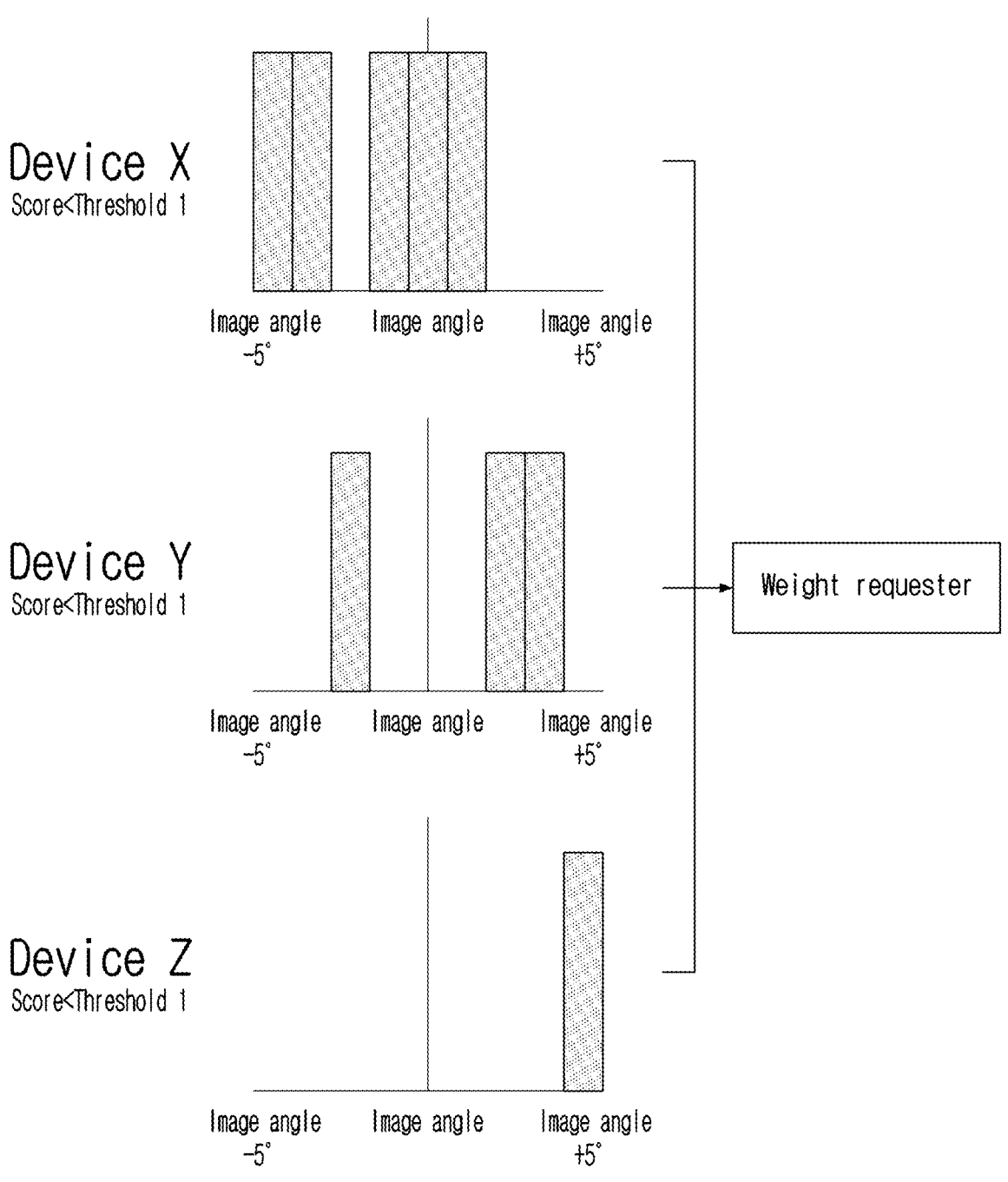
FIG. 14 is a schematic diagram illustrating how data may be combined from multiple client devices to generate a training dataset with a high non-bias score.

FIG. 13 is a schematic diagram illustrating when a secondary ML model may be trained. In this case, the training dataset on the client device may not have a good non-bias score. However, the dataset from one client device may be combined with datasets from other client devices to create a better combined training dataset. Thus, in this case, the secondary model is trained instead. The training method may further comprise: training a secondary ML model when the non-bias score is below the threshold value, and when the non-bias score is above a second predetermined threshold value, wherein the secondary ML model is a copy of the ML model for use when the non-bias score is below the threshold value. FIG. 14 is a schematic diagram illustrating how data may be combined from multiple client devices to generate a training dataset with a high non-bias score.

The ML model comprises a plurality of neural network layers and training the ML model or secondary ML model may comprise training a final layer of the plurality of neural network layers. This means the training can be performed on-device.

Training the ML model or secondary ML model may comprise training using the metadata of the training dataset, wherein for each image, the metadata comprises an embedding vector representing characteristics of the image and a predicted tilt angle of the image.

The training method may further comprise: receiving a request for model weights of the trained ML model; sharing, responsive to the request, model weights of the trained ML model with a central server for aggregating when the non-bias score is above the threshold value, thereby enabling the central server to update the ML model; and receiving the updated ML model from the central server. Preferably, the method may comprise clearing the training dataset on the client device of the metadata used to train the ML model.

Figure 15:
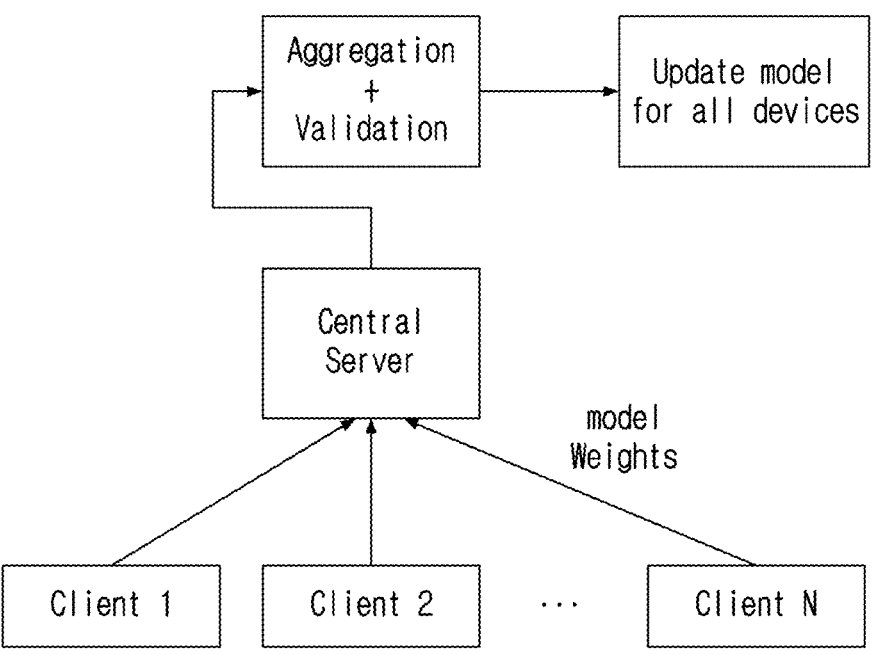
FIG. 15 is a schematic diagram illustrating one technique to train a ML model using federated learning.

FIG. 15 is a schematic diagram illustrating one technique to train a ML model using federated learning. Here, sharing model weights of the trained ML model with a central server may comprise: transmitting the model weights to the central server directly.

Figure 16:
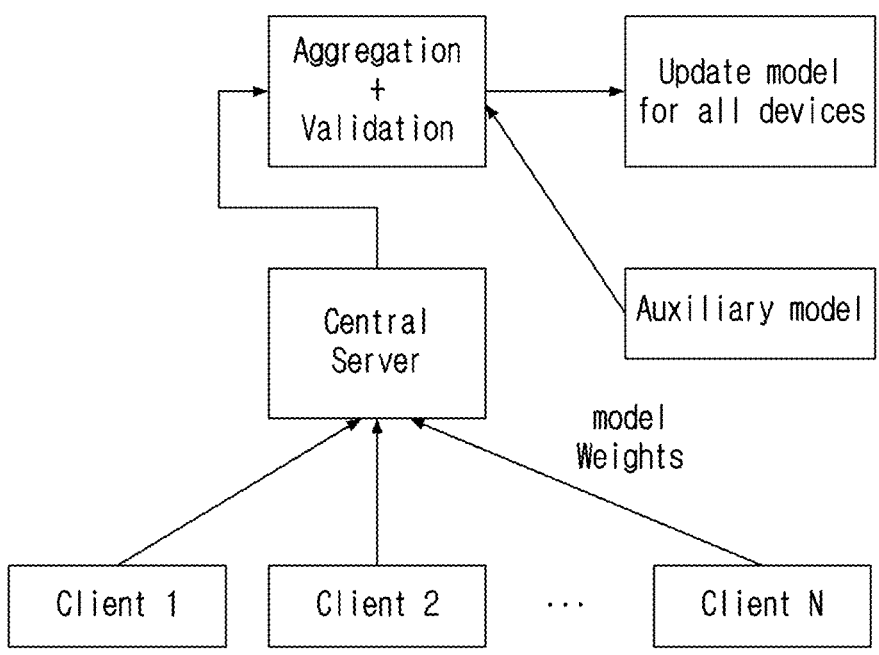
FIG. 16 is a schematic diagram illustrating another technique to train a ML model using federated learning.

FIG. 16 is a schematic diagram illustrating another technique to train a ML model using federated learning. Here, sharing model weights of the trained ML model with a central server may comprise: transmitting the model weights to at least one other client device of a plurality of client devices using a peer-to-peer distribution mechanism, wherein one client device of the plurality of client devices aggregates all model weights and transmits the aggregated model weights to the central server.

The training method may further comprise: receiving a request for model weights of the trained ML model; sharing, responsive to the request, a tilt angle histogram with a sender of the request, thereby enabling the sender to aggregate tilt angle histograms received from a plurality of client devices.

Model description (Experiments). An encoder network for extracting the content features from images was used. It was tested with MobilenetV2, EfficientNetLite and Resnet. In the experiments it was found out that MobilenetV2 produced the best results. The encoder was pre-trained on ImageNet before the tilt estimation training started, and a dense layer was added after it. An Adadelta optimizer and Mean Absolute Error loss were used. Other solutions were also tested including: 1) a last layer and adding a soft-max activation so the model is trained as a classification problem and not as regression, 2) combining both regression and classification layers and 3) training first using one and then fine-tune using the other last layer configuration. The best-obtained result was using just regression layer.

The experiments were conducted using Horizon Lines on The Wild and Mannequin Challenge datasets to produce the ground truth data. The network learns to estimate the roll of an input image that later on can be used to rectify it to be 0 (non-tilted image). A 0.001 learning rate, a 224×224 image input, a maximum of 10 epochs with an early stopping strategy (patience of 10) and a 0.5 learning rate reduction when plateau was detected, were used.

Once this model is trained it can be distributed along devices. Devices will just update the weights of the last layer (this can be expanded to include more layers if memory constraints allow it) and will use the encoder layers to extract content features that can be efficiently saved on device and used to avoid content duplicates (this step is optional since the location+tilt tuple exists to avoid duplicates). The cosine distance between two feature vectors can be calculated and the vectors are considered to be similar when the distance is lower than a manually-set threshold.

Figure 17:
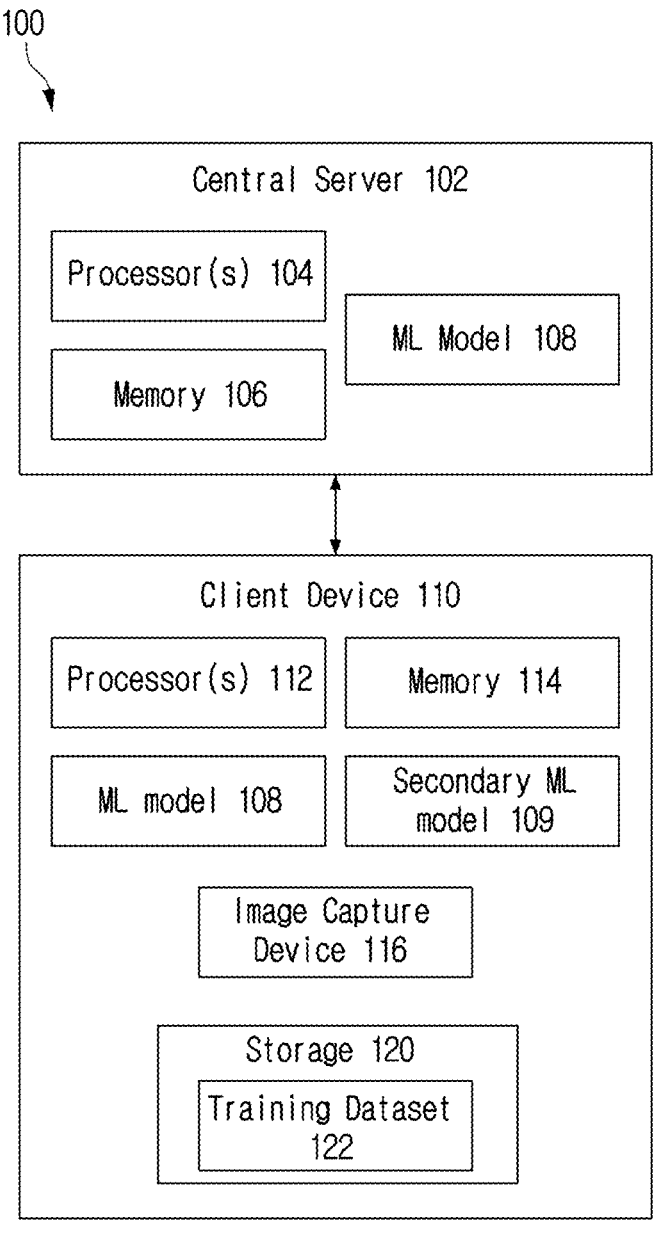
FIG. 17 is block diagram of a system for training a ML model using federated learning to perform image orientation correction.

FIG. 17 is block diagram of a system for training a ML model using federated learning to perform image orientation correction. The system 100 comprises a central server 102, and a plurality of client devices or apparatuses 110. For the sake of simplicity, a single apparatus 110 is shown here.

The server 102 comprises at least one processor 104 coupled to memory 106. The at least one processor 104 may comprise one or more of: a microprocessor, a microcontroller, and an integrated circuit. The memory 106 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The server 102 stores an ML model 108, which is to be trained using federated learning and the plurality of apparatus 110.

The apparatus 110 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example apparatus.

Each client device or apparatus 110 may comprise at least one processor 112 coupled to memory 114. The at least one processor 112 may comprise one or more of: a microprocessor, a microcontroller, and an integrated circuit. The memory 114 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example. The processor 112 may be arranged to perform the steps described above with reference to FIGS. 4 and 10. For the sake of simplicity, these methods are not described again here.

The apparatus 110 may further comprising at least one image capture device 116 for capturing images or videos to be used as the private training data.

System 100 may be used for training a machine learning, ML, model using federated learning to perform image orientation correction. The central server 102 may obtain and store an ML model for training. The plurality of client devices (110) may: obtain a ML model for training locally by the client device; check whether computational resources of the client device are available to train the ML model; and train the ML model, when the resources are available, using a training dataset on the client device, the training dataset comprising metadata associated with images having a range of tilt angles.

The processor 112 of each client device may be arranged to: determine, prior to training the ML model, whether a training dataset 122 on the client device has a non-bias score above a predetermined threshold value; and train the ML model 108 when the non-bias score is above the threshold value.

The processor 112 of each client device may be arranged to: train a secondary ML model 109 when the non-bias score is below the threshold value, and when the non-bias score is above a second predetermined threshold value, wherein the secondary ML model is a copy of the ML model for use when the non-bias score is below the threshold value.

The ML models 108, 109 comprise a plurality of neural network layers and training the ML model or secondary ML model may comprise training a final layer of the plurality of neural network layers.

Training the ML model 108 or secondary ML model 109 may comprise training using the metadata of the training dataset, wherein for each image, the metadata comprises an embedding vector representing characteristics of the image and a predicted tilt angle of the image.

The processor 112 of each client device may be arranged to: receive, from the central server 102, a request for model weights of the trained ML model of the client device; and share, responsive to the request, model weights of the trained ML model with the central server 102 when the non-bias score is above the threshold value.

The processor 104 of the central server may be arranged to: aggregate received model weights; update the ML model stored on the central server; and transmit the updated ML model to the plurality of client devices 110.

The processor 112 of each client device may be arranged to: clear the training dataset 122 on the client device of the metadata used to train the ML model.

The processor 112 of each client device may be arranged to transmit the model weights to the central server 102 directly.

The processor 112 of each client device may be arranged to transmit the model weights to at least one other client device of the plurality of client devices using a peer-to-peer distribution mechanism, wherein one client device of the plurality of client devices aggregates all model weights and transmits the aggregated model weights to the central server 102.

The processor 112 of each client device may be arranged to: receive, from a weights requester, a request for model weights of the trained ML model; and share, responsive to the request, a tilt angle histogram with the weights requester. The weights requester may aggregate tilt angle histograms received from a plurality of client devices. The weights requester may: transmit, to the client devices, a further request for model weights of their secondary ML models, when a non-bias score of the aggregated tilt angle histograms is above the threshold value. Preferably, the weights requester may: aggregate model weights of secondary ML models received from the client devices; transmit the aggregated model weights to the client devices for use; and transmit the aggregated model weights to the central server for updating the ML model. The weights requester may be a client device of the plurality of client devices.

Further embodiments of the present techniques are set out in the following numbered clauses:

1. A computer-implemented method, performed by a client device, for generating a training dataset for training a machine learning, ML, model using federated learning to perform image orientation correction, the method comprising: capturing an image of a scene using an image capture device of the client device; obtaining, from a sensor, a predicted tilt angle of the scene in the image; determining whether the captured image and predicted tilt angle improves a non-bias score of a database of the client device, the database forming a training dataset for training the ML model; and storing metadata associated with the captured image in the database of the client device when the captured image is determined to improve the non-bias score of the database.

2. The method according to clause 1 further comprising: determining, for each image corresponding to metadata stored in the database, an embedding vector representing characteristics of the image.

3. The method according to clause 2 further comprising: calculating a non-bias score for the database by calculating a difference between a dispersion value of a distribution of a target training dataset representing an unbiased dataset, and a dispersion value of the distribution of the database.

4. The method according to any preceding clause further comprising: augmenting data in the database with synthetically generated images to improve a non-bias score of the database.

5. The method according to clause 4 wherein augmenting the data in the database comprises: rotating the captured image to produce at least one synthetically generated version of the captured image having a tilt angle that improves a non-bias score of the database.

6. The method according to clause 5 wherein the rotation is between 5 degrees in a clockwise direction and 5 degrees in an anticlockwise direction.

7. The method according to clause 4 wherein augmenting the data in the database comprises: altering an appearance of the captured image to produce at least one synthetically generated version of the captured image.

8. The method according to clause 7 wherein altering an appearance of the captured image comprises applying one or more of: noise, Gaussian noise, a blur, motion blur, zoom blur, and simulated weather effects.

9. The method according to clause 4 wherein augmenting the data in the database comprises: inserting an object into the captured image to produce at least one synthetically generated version of the captured image while retaining a tilt angle of the original captured image.

10. The method according to any of clauses 2 to 9 wherein storing metadata associated with the captured image comprises storing the embedding vector representing characteristics of the image in the database.

11. A client device for generating a training dataset for training a machine learning, ML, model using federated learning to perform image orientation correction, the client device comprising: an image capture device, for capturing an image of a scene; a sensor for providing a predicted tilt angle of the scene in the captured image; storage comprising a database forming a training dataset for training the ML model; and at least one processor coupled to memory and arranged to: determine whether the captured image and predicted tilt angle improves a non-bias score of the database, and store metadata associated with the captured image in the database when the captured image is determined to improve the non-bias score of the database.

12. A computer-implemented method, performed by a client device, for training a machine learning, ML, model using federated learning to perform image orientation correction, the method comprising: obtaining a ML model for training locally by the client device; checking whether computational resources of the client device are available to train the ML model; and training the ML model, when the resources are available, using a training dataset on the client device, the training dataset comprising metadata associated with images having a range of tilt angles.

13. The method according to clause 12 further comprising: determining, prior to training the ML model, whether a training dataset on the client device has a non-bias score above a predetermined threshold value; and training the ML model when the non-bias score is above the threshold value.

14. The method according to clause 13 further comprising: training a secondary ML model when the non-bias score is below the threshold value, and when the non-bias score is above a second predetermined threshold value, wherein the secondary ML model is a copy of the ML model for use when the non-bias score is below the threshold value.

15. The method according to any of clauses 12 to 14 wherein the ML model comprises a plurality of neural network layers and training the ML model or secondary ML model comprises training a final layer of the plurality of neural network layers.

16. The method according to any of clauses 12 to 15 wherein training the ML model or secondary ML model comprises training using the metadata of the training dataset, wherein for each image, the metadata comprises an embedding vector representing characteristics of the image and a predicted tilt angle of the image.

17. The method according to any of clauses 13 to 16 further comprising: receiving a request for model weights of the trained ML model; sharing, responsive to the request, model weights of the trained ML model with a central server for aggregating when the non-bias score is above the threshold value, thereby enabling the central server to update the ML model; and receiving the updated ML model from the central server.

18. The method according to clause 17 further comprising: clearing the training dataset on the client device of the metadata used to train the ML model.

19. The method according to clause 17 or 18 wherein sharing model weights of the trained ML model with a central server comprises: transmitting the model weights to the central server directly.

20. The method according to clause 17 or 18 wherein sharing model weights of the trained ML model with a central server comprises: transmitting the model weights to at least one other client device of a plurality of client devices using a peer-to-peer distribution mechanism, wherein one client device of the plurality of client devices aggregates all model weights and transmits the aggregated model weights to the central server.

21. The method according to any of clauses 13 to 16 further comprising: receiving a request for model weights of the trained ML model; sharing, responsive to the request, a tilt angle histogram with a sender of the request, thereby enabling the sender to aggregate tilt angle histograms received from a plurality of client devices.

22. A client device for training a machine learning, ML, model using federated learning to perform image orientation correction, the client device comprising: at least one processor coupled to memory and arranged to: obtain a ML model for training locally by the client device; check whether computational resources of the client device are available to train the ML model; and train the ML model, when the resources are available, using a training dataset on the client device, the training dataset comprising metadata associated with images having a range of tilt angles.

23. A system for training a machine learning, ML, model using federated learning to perform image orientation correction, the system comprising: a central server comprising at least one processor coupled to memory to obtain and store an ML model for training; and a plurality of client devices, each client device comprising at least one processor coupled to memory and arranged to: obtain a ML model for training locally by the client device; check whether computational resources of the client device are available to train the ML model; and train the ML model, when the resources are available, using a training dataset on the client device, the training dataset comprising metadata associated with images having a range of tilt angles.

24. The system according to clause 23 wherein the processor of each client device is arranged to: determine, prior to training the ML model, whether a training dataset on the client device has a non-bias score above a predetermined threshold value; and train the ML model when the non-bias score is above the threshold value.

25. The system according to clause 24 wherein the processor of each client device is arranged to: train a secondary ML model when the non-bias score is below the threshold value, and when the non-bias score is above a second predetermined threshold value, wherein the secondary ML model is a copy of the ML model for use when the non-bias score is below the threshold value.

26. The system according to any of clauses 23 to 25 wherein the ML model comprises a plurality of neural network layers and training the ML model or secondary ML model comprises training a final layer of the plurality of neural network layers.

27. The system according to any of clauses 23 to 26 wherein training the ML model or secondary ML model comprises training using the metadata of the training dataset, wherein for each image, the metadata comprises an embedding vector representing characteristics of the image and a predicted tilt angle of the image.

28. The system according to any of clauses 24 to 27 wherein the processor of each client device is arranged to: receive, from the central server, a request for model weights of the trained ML model of the client device; share, responsive to the request, model weights of the trained ML model with the central server when the non-bias score is above the threshold value.

29. The system according to clause 28 wherein the processor of the central server is arranged to: aggregate received model weights; update the ML model stored on the central server; and transmit the updated ML model to the plurality of client devices.

30. The system according to clause 28 or 29 wherein the processor of each client device is arranged to: clear the training dataset on the client device of the metadata used to train the ML model.

31. The system according to any of clauses 28 to 30 wherein the processor of each client device is arranged to transmit the model weights to the central server directly.

32. The system according to any of clauses 28 to 30 wherein the processor of each client device is arranged to transmit the model weights to at least one other client device of the plurality of client devices using a peer-to-peer distribution mechanism, wherein one client device of the plurality of client devices aggregates all model weights and transmits the aggregated model weights to the central server.

33. The system according to any of clause 24 to 27 wherein the processor of each client device is arranged to: receive, from a weights requester, a request for model weights of the trained ML model; and share, responsive to the request, a tilt angle histogram with the weights requester.

34. The system according to clause 33 wherein the weights requester aggregates tilt angle histograms received from a plurality of client devices.

35. The system according to clause 33 or 34 wherein the weights requester: transmits, to the client devices, a further request for model weights of their secondary ML models, when a non-bias score of the aggregated tilt angle histograms is above the threshold value.

36. The system according to clause 35 wherein the weights requester: aggregates model weights of secondary ML models received from the client devices; transmits the aggregated model weights to the client devices for use; and transmits the aggregated model weights to the central server for updating the ML model.

37. The system according to any of clauses 33 to 36 wherein the weights requester is a client device of the plurality of client devices.

38. A non-transitory data carrier carrying code which, when implemented on a processor, causes the processor to carry out the method of any of clauses 1 to 10 and 12 to 21.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method, performed by a client device, for generating a training dataset for training a machine learning, ML, model using federated learning to perform image orientation correction, the method comprising:

capturing an image of a scene using an image capture device of the client device;

obtaining, from a sensor, a predicted tilt angle of the scene in the image;

determining whether the captured image and predicted tilt angle improves a non-bias score of a database of the client device, the database forming a training dataset for training the ML model; and storing metadata associated with the captured image in the database of the client device when the captured image is determined to improve the non-bias score of the database, wherein the method further comprising:

obtaining the non-bias score for the database based on a difference in dispersion between the database and an unbiased dataset.

2. The method as claimed in claim 1, further comprising:

determining, for each image corresponding to metadata stored in the database, an embedding vector representing characteristics of the image.

3. The method as claimed in claim 2, further comprising:

calculating the non-bias score for the database by calculating a difference between a dispersion value of a distribution of a target training dataset representing the unbiased dataset, and a dispersion value of the distribution of the database.

4. The method as claimed in claim 1, further comprising:

augmenting data in the database with synthetically generated images to improve the non-bias score of the database.

5. The method as claimed in claim 4, wherein augmenting the data in the database comprises:

rotating the captured image to produce at least one synthetically generated version of the captured image having a tilt angle that improves the non-bias score of the database.

6. The method as claimed in claim 5, wherein the rotation is between 5 degrees in a clockwise direction and 5 degrees in an anticlockwise direction.

7. The method as claimed in claim 4, wherein augmenting the data in the database comprises:

altering an appearance of the captured image to produce at least one synthetically generated version of the captured image.

8. The method as claimed in claim 7, wherein altering an appearance of the captured image comprises applying one or more of: noise, Gaussian noise, a blur, motion blur, zoom blur, and simulated weather effects.

9. The method as claimed in claim 4, wherein augmenting the data in the database comprises:

inserting an object into the captured image to produce at least one synthetically generated version of the captured image while retaining a tilt angle of the original captured image.

10. The method as claimed in claim 2, wherein storing metadata associated with the captured image comprises storing the embedding vector representing characteristics of the image in the database.

11. A client device for generating a training dataset for training a machine learning, ML, model using federated learning to perform image orientation correction, the client device comprising:

an image capture device, for capturing an image of a scene;

a sensor for providing a predicted tilt angle of the scene in the captured image;

storage comprising a database forming a training dataset for training the ML model; and at least one processor coupled to memory and arranged to:

determine whether the captured image and predicted tilt angle improves a non-bias score of the database, and store metadata associated with the captured image in the database when the captured image is determined to improve the non-bias score of the database, wherein the non-bias score for the database is obtained based on a difference in dispersion between the database and an unbiased dataset.

12. A computer-implemented method, performed by a client device, for training a machine learning, ML, model using federated learning to perform image orientation correction, the method comprising:

obtaining a ML model for training locally by the client device;

checking whether computational resources of the client device are available to train the ML model; and training the ML model, when the resources are available, using a training dataset on the client device, the training dataset comprising metadata associated with images having a range of tilt angles, wherein the ML model is trained based on a non-bias score for the database obtained based on a difference in dispersion between the training dataset and an unbiased dataset.

13. The method as claimed in claim 12, further comprising:

determining, prior to training the ML model, whether the training a training dataset on the client device has a non-bias score above a predetermined threshold value; and training the ML model when the non-bias score is above the threshold value.

14. The method as claimed in claim 13, further comprising:

training a secondary ML model when the non-bias score is below the threshold value, and when the non-bias score is above a second predetermined threshold value, wherein the secondary ML model is a copy of the ML model for use when the non-bias score is below the threshold value.

15. The method as claimed in claim 12, wherein the ML model comprises a plurality of neural network layers and training the ML model or secondary ML model comprises training a final layer of the plurality of neural network layers.

16. The method as claimed in claim 1, further comprising:
refrain from adding the metadata of the captured image in the database of the client device when the captured image is determined not to improve the non-bias score of the database.

17. The method as claimed in claim 1, wherein the non-bias score of the database is obtained based on a degree of dispersion of images in a target training dataset.

\* \* \* \* \*